(12) United States Patent
Doshi et al.

(10) Patent No.: US 6,444,342 B1
(45) Date of Patent: Sep. 3, 2002

(54) AIR FEED TUBE SUPPORT SYSTEM FOR A SOLID OXIDE FUEL CELL GENERATOR

(75) Inventors: Vinod B. Doshi, Monroeville; Roswell J. Ruka, Pittsburgh; Charles A. Hager, Zelienople, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 113 days.

(21) Appl. No.: 09/642,463

(22) Filed: Aug. 18, 2000

(51) Int. Cl.[7] .............................. H01M 8/10; H01M 8/12
(52) U.S. Cl. ........................... 429/31; 429/34; 429/35
(58) Field of Search ............................ 429/31, 34, 35

(56) References Cited

U.S. PATENT DOCUMENTS

| | | |
|---|---|---|
| 4,395,468 A * | 7/1983 | Isenberg ........................ 429/31 |
| 4,664,986 A | 5/1987 | Draper et al. |
| 4,808,491 A | 2/1989 | Reichner |
| 4,876,163 A | 10/1989 | Reichner |
| 5,573,867 A | 11/1996 | Zafredl |
| 6,221,522 B1 * | 4/2001 | Zafred et al. ................. 429/27 |

* cited by examiner

Primary Examiner—Stephen Kalafut
Assistant Examiner—Dah-Wei Yuan

(57) ABSTRACT

A solid oxide fuel cell generator (12), containing tubular fuel cells (36) with interior air electrodes (18), where a supporting member (82) containing a plurality of holes (26) supports oxidant feed tubes (51), which pass from an oxidant plenum (52") into the center of the fuel cells, through the holes (26) in the supporting member (82), where a compliant gasket (86) around the top of the oxidant feed tubes and on top (28) of the supporting member (82) helps support the oxidant feed tubes and center them within the fuel cells, and loosen the tolerance for centering the air feed tubes.

12 Claims, 3 Drawing Sheets

AIR FEED TUBE SUPPORT SYSTEM FOR A SOLID OXIDE FUEL CELL GENERATOR

GOVERNMENT CONTRACT

The Government of the United States of America has rights in this invention, pursuant to Contract No. DE-FC26-97FT34139 with the United States Department of Energy.

BACKGROUND OF THE INVENTION

1. Field of the Invention

This invention relates generally to oxidant feed tube supports for tubular solid oxide fuel cells (SOFCs) disposed in a fuel cell generator.

2. Background Information

High temperature, solid oxide electrolyte fuel cell generators, which are made of mostly ceramic components, and which allow controlled leakage among plural chambers in a sealed housing, are well known in the art, and are taught in U.S. Patent Nos. 4,395,468 and 5,573,867 (Isenberg and Zafred, et al., respectively). One type of such prior art generator design 12 is shown in FIG. 1 of the present application (which corresponds to FIG. 4 of the Zafred et al. patent). Here, oxidant gas enters air manifold 48 through oxidant inlet lines 20 as oxidant stream 50 (usually air), passing upward, possibly through cooling ducts, to a top air distribution plenum 52. The oxidant stream 50' is then transferred and passes downward via individual thin, ceramic oxidant feed tubes 51. The oxidant passes down the feed tubes 51 into the bottom interior of each fuel cell 36, where, as is well known in the art, the oxidant reverses flow and passes up the annular space between the oxidant feed tube and the interior air electrode, where it reacts along the air electrode interior surface. The reacted oxidant, in one embodiment of the fuel cell generator, finally enters a combustion chamber section 54 as spent oxidant, where the spent oxidant then combusts with spent fuel and the remaining unreacted feed fuel, to provide exhaust gas 56, which flows to an exhaust manifold. Part of the spent fuel may also be recirculated to the ejector 40, as shown in FIG. 1. The exhaust gas 56 passes through exhaust ducts 58. A power lead 84 is also shown in FIG. 1, and fuel inlet is shown as piping 38 which passes through preformer 42.

The tubular fuel cells include a solid oxide electrolyte sandwiched between two porous ceramic electrodes, an outer fuel electrode and an inner air electrode. FIG. 2 of the present application shows a prior art oxidant/air feed tube conduit support system employed in the Isenberg patent (shown in FIG. 2 of Isenberg). A metal tube sheet 34 has associated bores 60 that fit loosely around the oxidant feed tube conduits 51 to allow free thermal expansion. The oxidant feed tube conduits 51 are comprised of alumina or alumina compounds, and the tube sheet is covered with an insulation 62 such as low density alumina. Leakage of oxidant, into the combustion (pre-heating) chamber 16, as indicated by arrow 63 in FIG. 2, was considered acceptable. The oxidant feed tubes then proceed into the interior of the tubular fuel cells, as shown in FIG. 1 of the present application.

A later oxidant/air feed tube conduit support system was taught by Draper et al., in U.S. Pat. No. 4,664,986, and also in U.S. Pat. Nos. 4,808,491 and 4,876,163 (both Reichner). The prior art system of Draper et al. taught welding the air feed tube conduits to associated subheader tubes, so that there was substantially no air leakage. In the prior art Reichner system, as shown in FIG. 3 of the present application (and FIG. 1B of the Reichner '491 patent), oxidant/air feed 50 flows into top oxidant/air distribution plenum 52 and then into further oxidant/air distribution plenums 52', where the oxidant/air then passes downward via individual oxidant feed tubes 51. At the top of the oxidant feed tubes 51 spherical supports 70 kept the oxidant feed tubes in place. These spherical supports required a machined spherical seat 72 in the Inconel plenum wall 74 at the bottom of the plenums 52'. Insulation 76 surrounds the plenums. Steel enclosure 78 surrounds the fuel cell generator. Exhaust gas passages are shown as channels 80 and the bottom lower plenum enclosure insulation board is shown as 82 supporting the bottom of plenum 52'. The Isenberg design (as shown in FIG. 2 of this application) required precise cutting of the insulation layer and after thermal cycling, the possibility that the air feed tube would slip out of place to contact the bottom of the fuel cell cutting off the air supply for that cell. The Draper et al. design was very expensive and very heavy and required major machining and welding of Inconel components. The Reichner design (shown as FIG. 3 of the present application) also required substantial machining to properly set the spherical support. Also, in current SOFC design, a perfectly centered 72 in. (182.8 cm) long air feed tube in a 66 in. (167.6 cm) long cell permits only 0.1° freedom of movement before it closes the 0.125 inch (0.32 cm) radial gap and hits the inside surface of the cell. This radial gap is further reduced if there is any bow in the cell or the air feed tube. The difficulty of assembling the air feed tube in a cell is further compounded by any cell-to-cell and bundle-to-bundle lateral and torsional misalignment resulting from corresponding sintering operations. Due to the lack of lateral freedom and the extremely limited angular movement of the air feed tubs, there is a great likelihood of wedging the air feed tube into the cell wall during assembly if there is any distortion (lateral, torsional, or bow) of the cell.

What is needed is an improved, simpler, less expensive oxidant/air feed tube conduit support system that will require only minimal or no metal finishing. Therefore, it is one of the main objects of this invention to support the oxidant/air feed tubes in such a way as to keep them from contacting the sides or bottom inside of the fuel cells. It is another main object to provide a simpler, significantly less expensive oxidant/air feed tube support system which requires minimal or no metal finishing. It is also an object of this invention to provide a minimum leakage seal between the air plenum and the rest of the SOFC module and to bring the design to a commercialization level.

SUMMARY OF THE INVENTION

These and other objects of the invention are accomplished by providing a solid oxide fuel cell generator comprising: hollow, tubular fuel cells with interior air electrodes; an oxidant plenum having a lower enclosing member; and oxidant feed tubes; where the enclosing member contains a plurality of holes, and supports the oxidant feed tubes, which pass from the oxidant plenum into the center of the fuel cells through the holes in the enclosing member; and where a compliant gasket around the top portion of the oxidant feed tubes and on top of the enclosing member helps center the oxidant feed tubes within the fuel cells. The compliant gasket provides a cushion during shipping and during generator use. The gasket is held on by friction, no glue being necessary.

The invention also resides in a solid oxide fuel cell generator comprising: (1) a plurality of electrically connected hollow, tubular, solid oxide fuel cells which can operate on feed fuel and oxidant gases; (2) an oxidant plenum within the generator for receiving and distributing fed oxidant to the fuel cells; (3) a lower enclosure for the oxidant plenum having a plurality of holes therethrough; and (4) a plurality of hollow oxidant feed tubes extending from the oxidant plenum, through the lower oxidant plenum enclosure holes into the inside of the fuel cells where the lower oxidant plenum enclosure has at least a flat top surface facing the oxidant plenum and supports the oxidant feed tubes by contact with a washer and gasket tube support combination, which combination is disposed around the outer circumference of the oxidant feed tubes and on top of the flat top surface of the oxidant plenum enclosure;. where the tube support combination consists of a top, hard washer bonded to the oxidant feed tubes and a compliant gasket disposed on top of and contacting the flat top surface of the lower oxidant plenum enclosure between the washer and the lower oxidant plenum enclosure, and where at least the gasket has a bottom surface which mates to the flat top surface of the lower oxidant plenum enclosure. Preferably the gasket will completely cover the lower oxidant plenum enclosure holes, which can be oversized, by as much as 20% to 30% to allow adjustment of the feed tube positioning to provide good alignment of the oxidant feed tubes to center them within the inside of the hollow fuel cells. The dense washer is preferably attached to the oxidant feed tubes and helps compress the compliant gasket and prevent the feed tubes from sliding or slipping through the holes in the enclosing member.

Among the important advantages of this design: it permits an increase in the plenum hole diameter, thus providing the needed freedom for increased lateral and rotational alignment of the air feed tube with the cell at assembly; it reduces the support system cost by a factor of 6 to 10; it eliminates the costly spherical seal machining in the air plenum, further reducing the plenum cost; and the ability to increase the plenum hole diameter permits relaxing the feed tube bow requirements over the full length, thereby significantly reducing the rejection rate and reducing the cost of the air feed tube by a factor of 8 to 10. The cost of the air feed tube is dramatically reduced because key manufacturing tolerances can be relaxed, thereby lowering reject rates.

BRIEF DESCRIPTION OF THE DRAWINGS

The invention is further illustrated by the following non-limiting drawings, in which.

DESCRIPTION OF THE PREFERRED EMBODIMENTS

Figure 4:
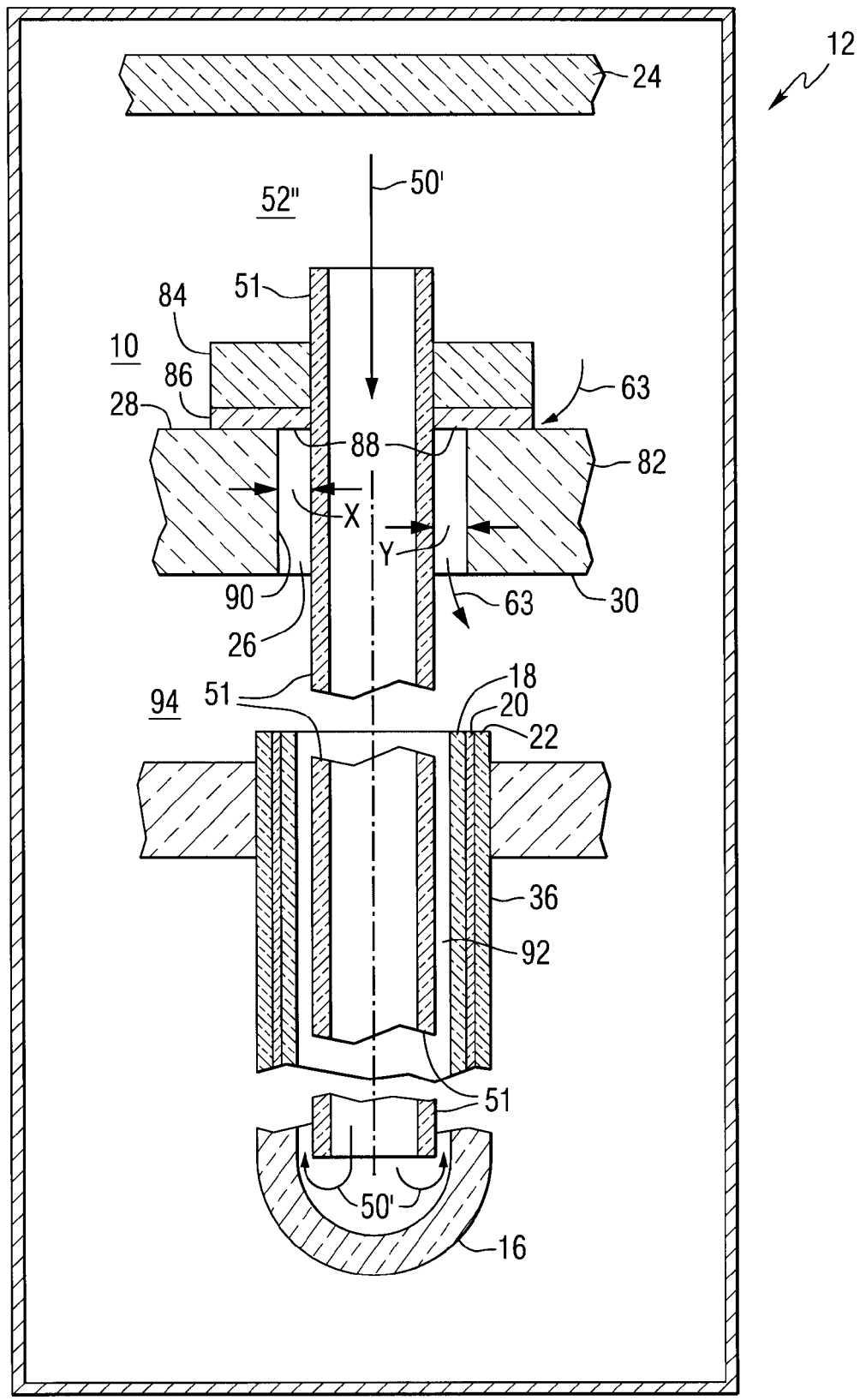
FIG. 4, which best illustrates the invention, is a broken, cross-section view of a portion of a fuel cell generator showing the oxidant feed tube support system of this invention with associated fuel cell and bottom or lower insulating oxidant plenum enclosure/support/partition member.

Referring now to FIG. 4, an oxidant/air feed tube conduit support system 10 is shown inside a solid oxide fuel cell generator (SOFC), represented by enclosure 12.

Figure 1:
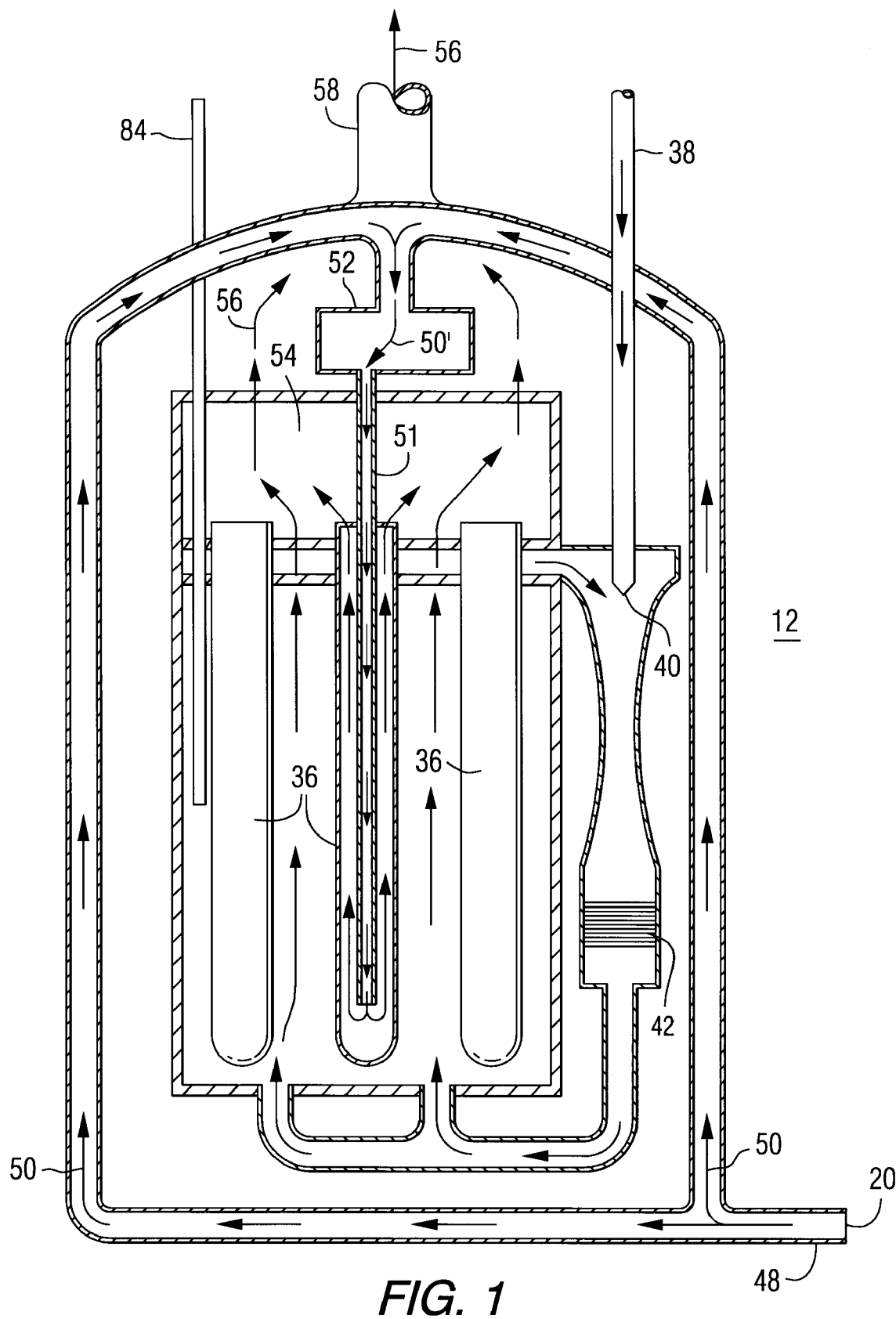
FIG. 1 is a cross-sectional view which illustrates one embodiment of a prior art solid oxide fuel cell generator, showing oxidant inlet lines, the oxidant plenum, a plurality of hollow fuel cells having an open and a closed end, and oxidant feed tubes.
Figure 2:
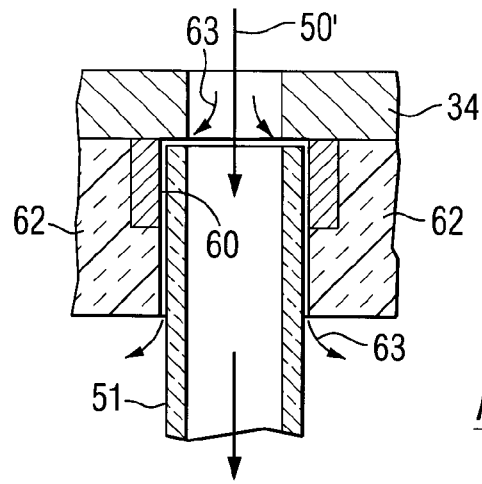
FIG. 2 is a cross-sectional view illustrating one type of prior art oxidant feed tube support system.

Hollow, tubular, solid oxide fuel cell 36 is shown, having an open top portion and a closed bottom portion.16 and comprised of inner ceramic air electrode 18, solid oxide ceramic electrolyte 20, and outer fuel electrode 22, generally of a cermet material, where hollow, ceramic oxidant feed tube 51 passes into the inside of the fuel cell. A plurality of these fuel cells are bundled together and interconnected, not shown in the drawings but, as is well known in the art, within a generator section (shown in FIG. 1) of the SOFC generator 12. The fuel cells can operate on feed oxidant/air 50' which is fed through the feed tube 51 to the bottom 16 of the fuel cell where it reverse flows up the fuel cell, contacting the inner air electrode 18 in the process, as shown in FIG. 4 (and also in FIG. 1).

Figure 3:
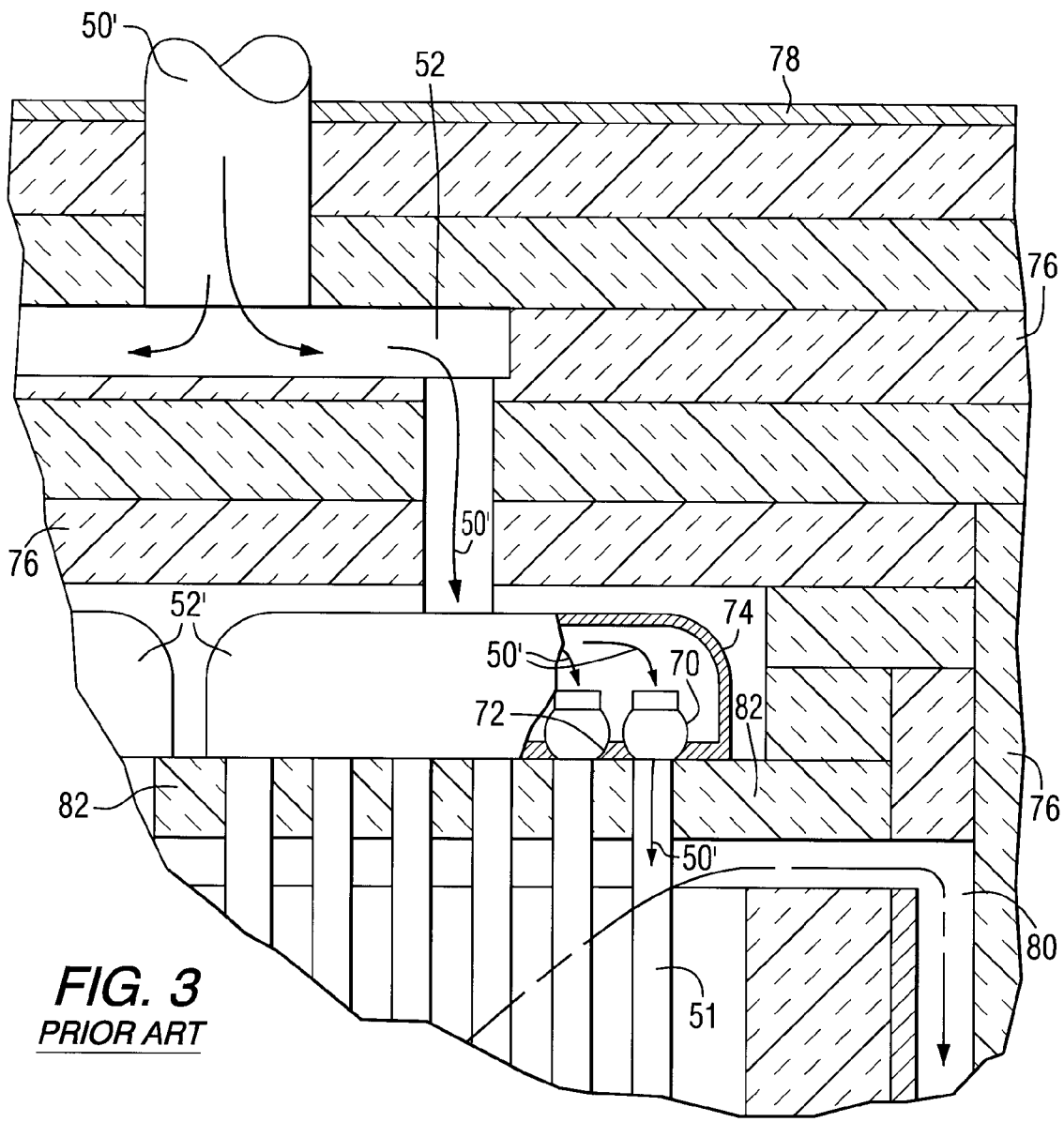
FIG. 3 is a cross-sectional view illustrating a portion of a fuel cell generator with another type of prior art oxidant feed tube support system.

The oxidant stream 50' passes from an oxidant plenum 52" within the generator 12, enclosed by lower or bottom enclosure member/partition/support member, which can be insulating, as shown here, defined as the "lower oxidant plenum enclosure" 82. An upper enclosure member is generally shown as ceramic member 24. Member 24 can also be metallic. In the past, the oxidant plenum 52" has had a volume enclosed by metallic members, such as an Inconel structure enclosed by upper, lower and side structural members, as shown in FIG. 3 as 52'. It is advantageous to have the oxidant plenum volume 52" enclosed by less costly alumina insulation members, including for example top members 24 and bottom members 82 (shown in FIG. 4). The lower oxidant plenum enclosure 82 has a plurality of holes, such as hole 26, through it. A plurality of the hollow oxidant feed tubes, one shown as 51, extend from the oxidant plenum 52", through lower oxidant plenum enclosure holes 26, and into the inside of fuel cells 36.

The lower oxidant plenum enclosure 82 has a flat top 28, facing the oxidant plenum 52", and usually a flat bottom 30. The lower oxidant plenum enclosure 82 supports the oxidant feed tubes 51 by contact with a washer 84: and gasket 86 support combination, which surrounds the outer circumference of the oxidant feed tube within the oxidant plenum 52", where the support combination is on top of the flat top surface 28 of the oxidant plenum enclosure 82. The washer 84 is a hard, high purity (that is, at least 90% pure) alumina ($Al_2O_3$) about 90% to 95% dense (5% to 10% porous). The washer preferably is from about 0.15 inch to 0.35 inch (0.38 cm to 0.89 cm) thick and sits on top of the compliant gasket to hold it in place. The gasket 86 is a high purity (at least 90% pure, preferably about 95% pure) fibrous alumina commercial paper compressed to be about 2% to 15% dense (85% to 98% porous).

The washer 84 can be cemented, fused, sintered or otherwise physically bonded or attached to the top of the oxidant feed tube, whereas the gasket 86 will have a tight fit but will be slidable on the feed tube, not requiring any sintering or gluing, being held in place by the washer. As shown, there can be a small flow leakage 63 of oxidant through the gasket. The gasket 86 is disposed on the top 28 of the lower oxidant plenum enclosure 82, between the contacting washer 84 and the plenum enclosure 82, where at least the gasket 86 has a bottom surface 88, preferably flat, which mates or fits flush with the top surface 28 of the lower oxidant plenum enclosure. Usually, the top and bottom of both the gasket and washer will be flat, as shown in FIG. 4. The gasket 86 will cover the hole 26 through the lower oxidant plenum enclosure 82, as shown. The soft, porous construction of the gasket is important, and provides a cushion for uneven plenum surface 28 finish and will help in preventing too much oxidant leakage 63 while providing alignment movement to center the oxidant feed tube within each fuel cell. These holes 26 can be oversized, so that distances x and y can exist between the sides of the hole 90 and the oxidant feed tubes 51, allowing offcentering the feed tubes 51 in holes 26, in order to adjust for fuel cell bundle misalignment and to allow all of the feed tubes to be substantially centered within the fuel cells. The inside diameter of the hole 26 can be about 20% to 30% larger than the outside diameter of the oxidant feed tube. Under 20%, oxidant feed tube movement is too greatly restricted; over 30%, structural integrity suffers and the gasket will not have sufficient support and might contact other gaskets. This provides a tremendous advantage over the very closely spaced prior designs. Thus, the oxidant feed tubes 51 need not be centered within the lower oxidant plenum enclosure holes 26, so that x need not equal y. This insures that there will usually be a space 92 between the air electrode 18 and the feed tube 51 within the fuel cell. The chamber 94 below the lower oxidant plenum enclosure 82 can be a combustion/preheater chamber in one generator design, or a vitiated oxidant exhaust chamber in other designs.

EXAMPLE

A hollow alumina oxidant feed tube 72 inches (182.8 cm) long and 0.4 inch (1.0 cm) in outside diameter was fitted at its top with a dense, flat, hard, high purity alumina washer having an inside diameter of 0.4 inch. (1.0 cm), an outside diameter of 0.88 inch (2.23 cm), and a thickness of 0.25 inch (0.64 cm). The assembly was then heated to about 800° C. to fuse the washer to the top of the feed tube. Then a soft, flat, compliant, high purity alumina gasket, having the same inside and outside diameters as the washer but with a thickness of 0.13 inch (0.33 cm), was slipped on the feed tube from the bottom and brought up the tube to contact and be below the washer.

An oxidant feed tube with the surrounding gasket and washer combination was then placed through the hole in the top of the flat bottom of an oxidant plenum where the holes were directly over and lined up with a fuel cell containing 66 inch (167.6 cm) long fuel cells. The holes were 20% to 30% larger diameter than the outside diameter of the feed tube. The feed tube was slid into the inside of the fuel cell with only a 0.125 inch (0.32 cm) radial gap between the outside surface of the feed tube and the inside surface of the fuel cell, similar to the design of FIG. 4. The feed tube could be adjusted easily to avoid contact with the interior of the fuel cell, due to the oversize hole of the plenum and the compliant nature of the gasket.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalent thereof.

What is claimed is:

1. A solid oxide fuel cell generator comprising:
   hollow, tubular fuel cells with interior air electrodes;
   an oxidant plenum having as its lower enclosure, a lower enclosing insulation member;
   a chamber below the oxidant plenum operating as a combustion/preheater chamber or a vitiated oxidant exhaust chamber; and
   oxidant feed tubes;
   where the enclosing insulation member contains a plurality of holes, and supports the oxidant feed tubes which pass from the oxidant plenum, through the chamber below the oxidant plenum and into the center of the fuel cells through the holes in the enclosing insulation member; where the lower enclosing insulation member holes are from 20% to 30% larger than the outside diameter of the oxidant feed tubes; and where a separate gasket around the top portion of the oxidant feed tubes and on top of the enclosing insulation member has a tight fit with the oxidant feed tube and centers the oxidant feed tubes within the fuel cells.

2. The fuel cell generator of claim 1, having a washer disposed on top of the gasket to further hold it in place.

3. The fuel cell generator of claim 2, where the washers are attached to the oxidant feed tubes and compress the gasket and prevent the feed tubes from sliding through the holes in the enclosing member.

4. The fuel cell generator of claim 1, wherein the oxidant plenum has a volume enclosed by insulating or metallic members including the enclosing member, where a washer 90% to 95% dense is disposed on top of the gasket, and the gasket is 2% to 15% dense and compliant allowing movement of the oxidant feed tubes.

5. A solid oxide fuel cell generator consisting essentially of:
   (1) a plurality of electrically connected hollow, tubular, solid oxide fuel cells which can operate on feed fuel and oxidant gases;
   (2) an oxidant plenum within the generator for receiving and distributing feed oxidant to the fuel cells;
   (3) a lower enclosing insulation member as the enclosure for the oxidant plenum having a plurality of holes therethrough;
   (4) a chamber below the oxidant plenum operating as a combustion/preheater chamber or a vitiated oxidant exhaust chamber; and
   (5) a plurality of hollow oxidant feed tubes extending from the supported oxidant plenum, through the lower oxidant plenum enclosure holes, then through the chamber below the oxidant plenum and into the inside of the fuel cells;
   wherein the lower oxidant plenum insulation enclosure has at least a flat top surface facing the oxidant plenum and supports the oxidant feed tubes by contact with a separate washer and gasket tube support combination, which is disposed around the outer circumference of the oxidant feed tubes and on top of the flat top surface of the oxidant plenum enclosure insulation member; wherein the tube support combination consists of a top, 90% to 95% dense washer bonded to the oxidant feed tubes and a 2% to 15% dense gasket disposed on top of and contracting the flat top surface of the lower oxidant plenum enclosure between the washer and the lower oxidant plenum enclosure; and wherein at least the gasket has a tight fit with the oxidant feed tube and has a bottom surface which mates to the flat top surface of the lower oxidant plenum enclosure.

6. The fuel cell generator of claim 5, wherein the gasket in the tube support combination completely covers the lower oxidant plenum enclosure holes.

7. The fuel cell generator of claim 5, wherein the lower oxidant plenum enclosure holes are from 20% to 30% larger than the outside diameter of the ceramic oxidant feed tubes, allowing centering of the feed tubes within the inside of each of the hollow fuel cells.

8. The fuel cell generator of claim 5, wherein the fuel cells comprise an outside fuel electrode, an inner air electrode, and a solid oxide electrolyte between them; and wherein the top is open and the bottom is closed.

9. The fuel cell generator of claim 5, wherein the oxidant plenum has a volume that is enclosed by members including the lower oxidant plenum enclosure.

10. The fuel cell generator of claim 5, wherein the top washers are physically bonded to the top portion of the oxidant feed tubes and prevent the feed tubes from sliding through the holes in the lower enclosures.

11. The fuel cell generator of claim 5, wherein the top washers are made from a ceramic.

12. The fuel cell generator of claim 5, wherein the gaskets are flat, alumina, at least 90% pure, and allow movement of the oxidant feed tubes.

* * * * *